L. W. CHUBB & H. R. EDGECOMB.
APPARATUS FOR TREATING WIRES AND CABLES.
APPLICATION FILED JAN. 26, 1910.
1,068,412.  Patented July 29, 1913.
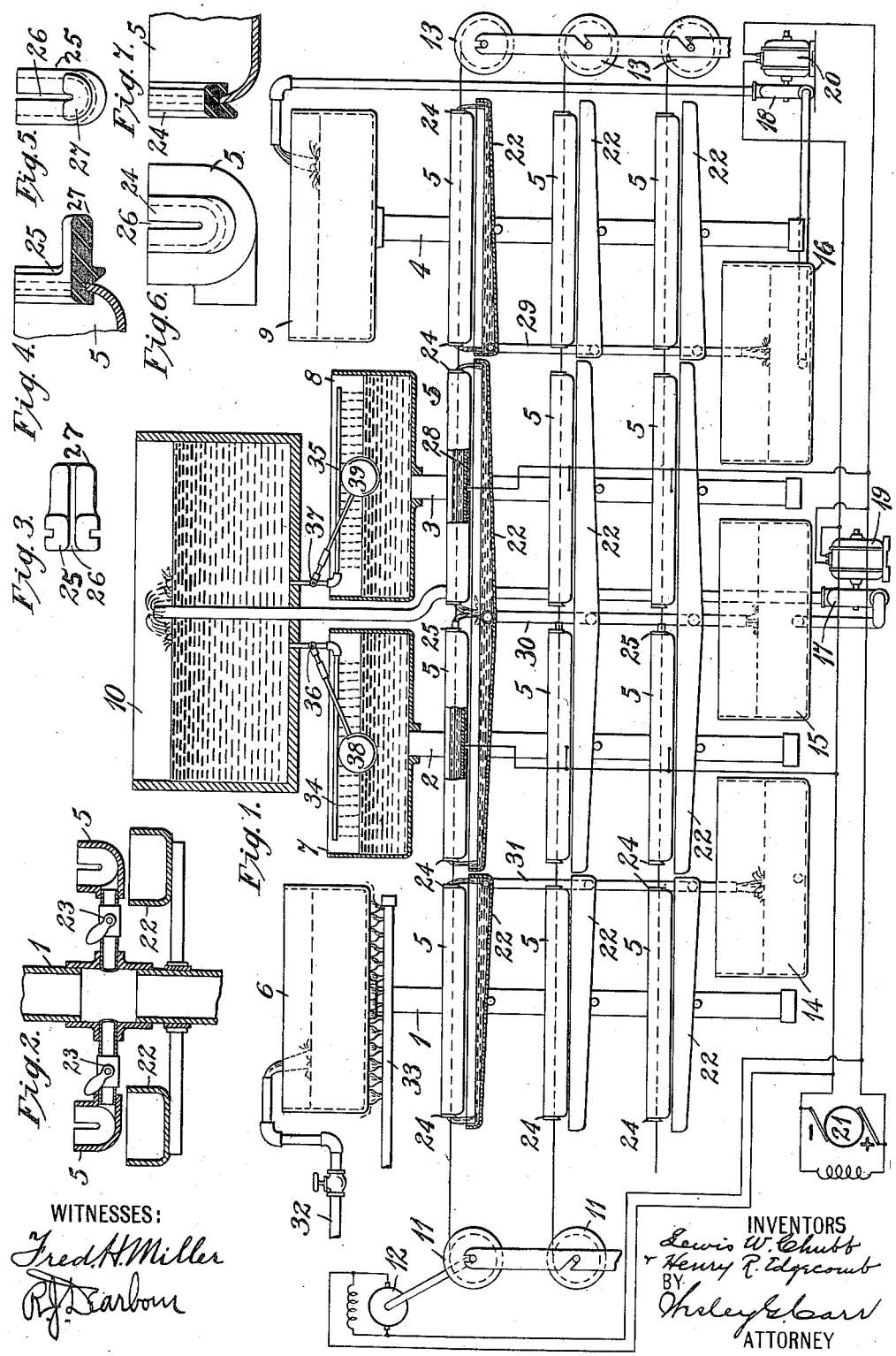

UNITED STATES PATENT OFFICE.

LEWIS W. CHUBB, OF WILKINSBURG, AND HENRY R. EDGECOMB, OF EDGEWOOD PARK, PENNSYLVANIA, ASSIGNORS TO WESTINGHOUSE ELECTRIC & MANUFACTURING COMPANY, A CORPORATION OF PENNSYLVANIA.

APPARATUS FOR TREATING WIRES AND CABLES.

1,068,412.  Specification of Letters Patent.  Patented July 29, 1913.

Application filed January 26, 1910. Serial No. 540,220.

*To all whom it may concern:*

Be it known that we, LEWIS W. CHUBB and HENRY R. EDGECOMB, citizens of the United States, and residents of Wilkinsburg and Edgewood Park, respectively, in the county of Allegheny and State of Pennsylvania, have invented a new and useful Improvement in Apparatus for Treating Wires and Cables, of which the following is a specification.

Our invention relates to systems and apparatus for electrolytically treating wires and cables to produce insulating coatings on their surfaces.

The object of our invention is to provide a system of the character above indicated which shall embody simple and durable apparatus and shall permit a plurality of wires or cables to be continuously treated at the same time and be always accessible.

According to our present invention, we provide a series of liquid-containing tanks having narrow, oppositely located slots or notches through which the wire or cable to be treated is passed and out of which the liquid is permitted to flow continuously. Receptacles are provided below the tanks for catching the liquids discharged from the tanks, and means are provided for again using the same liquid and thus making the process continuous, with a constant quantity of liquid.

We prefer to employ several groups of tanks, arranged one above another and supported by stand-pipes which, at the same time, provide communication between them, each stand-pipe being provided with a reservoir in which the level of the liquid is maintained constant. It may be found desirable to permit the liquid from one tank to overflow into the tank next below instead of providing special receptacles for catching the overflow.

Figure 1 of the accompanying drawings is a diagrammatic view of a system embodying our invention. Fig. 2 is a sectional elevation disclosing the structure of one group of tanks such as are shown in outline in Fig. 1, and Figs. 3, 4, 5, 6 and 7 are detail views of the tanks and their attachments.

Referring to the drawings, the system here shown comprises a plurality of stand-pipes 1, 2, 3 and 4, which are preferably arranged side-by-side and are severally provided with a plurality of liquid-containing tanks 5, liquid-supply tanks or reservoirs 6, 7, 8 and 9 respectively located at the tops of the stand-pipes which are supplied from them; a distributing reservoir 10, which supplies electrolyte to the reservoirs 7 and 8, a plurality of gathering reels 11, a driving motor 12 therefor, supply reels 13, exhaust reservoirs 14, 15 and 16, fluid pumps 17 and 18, driving motors 19 and 20 therefor, and an electric generator 21.

The tanks 5 are arranged in groups of two, as shown in Fig. 2 of the drawings, and are supported by and communicate with the stand-pipe which is located between them. A receptacle 22 is supported directly below each tank for the purpose of catching the liquid which is discharged from it, and the amount of liquid supplied to each tank is regulated by a valve 23, which is located between the tank and the stand-pipe.

The stand-pipes have corresponding tanks which are in alinement with each other and which constitute a series or group through which one of the wires to be treated is passed. The number of tanks attached to a single stand-pipe will depend upon the number of wires or cables which it is desired to treat at one time, and may be varied as desired.

The tanks 5 may be of any suitable form, the semi-cylindrical structure shown in the drawings being preferable. Insulating blocks 24 and 25 are located at opposite ends of the tanks and are provided with narrow slots or notches 26, through which the conductor may pass below the level of the liquid within, the liquid flowing constantly through the slots or notches into the receptacles 22 which are located below, as already described.

The slots 26 are so narrow that the liquid escapes from the tanks at a relatively slow rate, and, consequently, the liquid level may readily be maintained by properly regulating the amount of liquid which is permitted to enter the tanks from the stand-pipes. The insulators 25 differ from the insulators 24 in that they are provided with outwardly extending nose projections 27, as shown in Figs. 3 and 4 of the drawings, which contain small bodies of liquid through which the wire enters the tanks pertaining to the stand-pipe 2, and which are connected to the negative terminal of the electric generator 21. The projections 27 extend outwardly from the tanks in the direction from which the wire is fed, and, consequently, a relatively high resistance, for the electric current through the wire and through the liquid in the tanks is first provided, by reason of the small volume of liquid in the projections 27.

The voltage impressed upon the conductor is, therefore, increased until it is a maximum within the tanks. This gradual application of voltage has been found most advantageous in producing an insulating coating on the conductor under treatment. The long nose projection 27 of the insulator 25 is obviously a very simple means for accomplishing this result and makes the use of more than one tank, in which the electrolytic process is carried on, unnecessary.

The tanks secured to the stand-pipe 4 contain a suitable cleaning solution. The tanks secured to the stand-pipes 3 and 2 preferably contain a sodium silicate solution, and the tanks secured to the stand-pipe 1 are preferably filled with hot water. The circuit connections for the tanks are clearly indicated in the drawing, the positive terminal of the generator 21 being connected to conducting plates or linings 28 within the tanks of the stand-pipe 3, and the negative terminal being similarly connected to the tanks of the stand-pipe 2.

The operation of, and circuit connections for, the system are as follows: Assuming that the receptacles 6, 7, 8, 9 and 10 are partially filled with liquids suitable to their locations in the system; if the valves 23 are so regulated that liquid is fed from each of the stand-pipes to each of tanks 5 and overflows into the receptacles 22, liquid will be discharged through pipes 29, 30 and 31 into the receiving tanks 16, 15 and 14.

In order that the liquid in the supply tanks may be replenished, the pumps 17 and 18 are so operated by the motors 19 and 20 that liquid is forced from the receiving tank 16 into the supply tank 9 and from the receiving tank 15 into the reservoir 10. The tank 6 is supplied from any suitable source, such as water main 32, and is maintained at proper temperature by a gas burner 33 or by any other suitable means. Liquid is supplied from the tank 10 to the tanks 7 and 8 through specially constructed discharge pipes 34 and 35 which are perforated to permit the fluid to be discharged in a large number of very small streams, this being done to include high resistance between the tanks 7 and 8 and thus minimize the electric current leakage from one to the other, through the liquid in the supply reservoir. The pipes 34 and 35 are preferably provided with valves 36 and 37, which are controlled by floats 38 and 39 and which are arranged to automatically maintain substantially constant liquid levels in the tanks 7 and 8.

The conductors from the supply reels 13 are connected to the gathering reels 11 and are then dropped into the series of tanks through which they are to pass, the slots 26 being adapted to receive them. The electric motor 12 is then operated to draw the wires through the tanks and, as soon as the process is under way, the conductor is automatically washed and prepared in the tanks of stand-pipe 4; is supplied with electrical energy in the tanks 5 of stand-pipe 3, and is electrolytically treated in the tanks of stand-pipe 2. Finally the conductors are washed in the hot water tanks of stand-pipe 1.

The tanks of the pipe 4 may be omitted and any other means for washing the conductor may be substituted for those of the pipe 1.

If it is desired to inspect any portion of the wire, or if it is necessary to take the wire out at any stage, it is only necessary to stop the motor 12 and to lift the wire out of the tanks, using an insulating hook or holder until the wire is completely separated from the tanks of the pipe 2. This is obviously very simple and easy and renders the conductors accessible at all times. The multiple arrangement of tanks permits a number of conductors of the same or different sizes to be treated at one time and makes the apparatus practical for commercial service on a large scale.

The structure of the apparatus and the arrangement of parts in the system may be modified within the spirit and scope of our invention.

We claim as our invention:

1. In wire coating apparatus, the combination with a liquid-containing tank having open-top slots in its opposite walls through both of which the liquid is permitted to discharge, of means for passing a conductor through said openings and through the liquid.

2. In wire coating apparatus, the combination with a liquid-containing tank having open-top slots in its opposite walls extending below the liquid level and means for maintaining a substantially constant quantity of liquid in said tank, of means for continuously passing a conductor through the slots and through the liquid.

3. In wire coating apparatus, the combination with a plurality of liquid-containing tanks having narrow slots in their opposite walls, a common reservoir from which the tanks are supplied and automatic means for maintaining the liquid level above the bottoms of said slots, of means for passing a conductor to be treated continuously through the slots in the successive tanks and through the liquids therein, the slots in the tanks being in alinement with each other and the liquid being permitted to discharge therethrough.

4. In wire coating apparatus, the combination with a stand-pipe, a plurality of lquid-containing tanks, supported by and connected to said pipe and having narrow slots in their opposite walls, and a liquid-containing reservoir from which the stand-pipe is supplied and means for passing a plurality of conductors through the slots in the respective tanks and through the liquids contained therein, the liquid in each tank being permitted to continuously discharge through the slots.

5. Wire coating apparatus comprising an open receptacle having notches in its opposite walls and means for maintaining a substantially constant liquid level within the receptacle, the liquid being permitted to continuously discharge through the notches.

6. Wire coating apparatus comprising an open receptacle, notched insulating blocks set in opposite walls of the liquid-containing receptacle and having outwardly extending projections for guiding the liquid which is discharged from the receptacle through the notches.

7. In wire coating apparatus, the combination with a plurality of groups of liquid-containing tanks or receptacles, each having narrow slots in its opposite walls, the receptacles of each group being substantially in the same horizontal plane, with their slots in alinement, of means for maintaining a substantially constant liquid level in each of the tanks or receptacles, and means for continuously passing a conductor through the slots in the tanks of each group and below the level of the liquid therein, the liquid in each tank being permitted to discharge continuously from the slots.

In testimony whereof, we have hereunto subscribed our names this 19th day of Jan., 1910.

LEWIS W. CHUBB.
HENRY R. EDGECOMB.

Witnesses:
L. M. KLAUBER,
B. B. HINES.